United States Patent [19]

Culbertson

[11] 3,754,335

[45] Aug. 28, 1973

[54] INSTRUMENT FOR DETERMINING THE DIAMETER OR RADIUS OF AN OBJECT OF CIRCULAR CROSS SECTION

[76] Inventor: Delbert D. Culbertson, Salem, Oreg.

[22] Filed: Apr. 7, 1971

[21] Appl. No.: 132,156

Related U.S. Application Data

[63] Continuation-in-part of Ser. No. 862,835, Oct. 1, 1969, abandoned.

[52] U.S. Cl. .............................................. 33/178 R
[51] Int. Cl. .............................................. G01b 5/08
[58] Field of Search .................... 33/178 R, 178 D, 33/143 M

[56] References Cited
UNITED STATES PATENTS

| | | | |
|---|---|---|---|
| 2,498,397 | 2/1950 | Daly | 33/143 M |
| 2,603,872 | 7/1952 | Jones | 33/178 R |

FOREIGN PATENTS OR APPLICATIONS

| | | | |
|---|---|---|---|
| 154,266 | 9/1903 | Germany | 33/178 R |
| 22,310 | 9/1910 | Great Britain | 33/178 R |
| 1,176,878 | 8/1964 | Germany | 33/178 R |
| 130,186 | 12/1950 | Sweden | 33/178 R |

*Primary Examiner*—Louis R. Prince
*Assistant Examiner*—Dennis A. Dearing
*Attorney*—Oliver D. Olson

[57] ABSTRACT

One of a pair of interconnected arms, defining straight edges arranged angularly to provide an included angle of less than 180°, is graduated to form a scale of linear measurement which increases in magnitude outward from the apex of the angle. An index pin is mounted for movement along the scale and projects inward thereof for engagement with an object of circular cross section contacting the straight edges of both arms. The pin is moved along the scale into contact with the object at both sides of the point of contact of the object with the straight edge of the scale arm. The sum of the scale readings at said points of contact of the pin with the object is related to the diameter of the object by some whole integer or fraction thereof, depending upon the magnitude of said included angle and the type of said scale.

4 Claims, 6 Drawing Figures

Patented Aug. 28, 1973
3,754,335
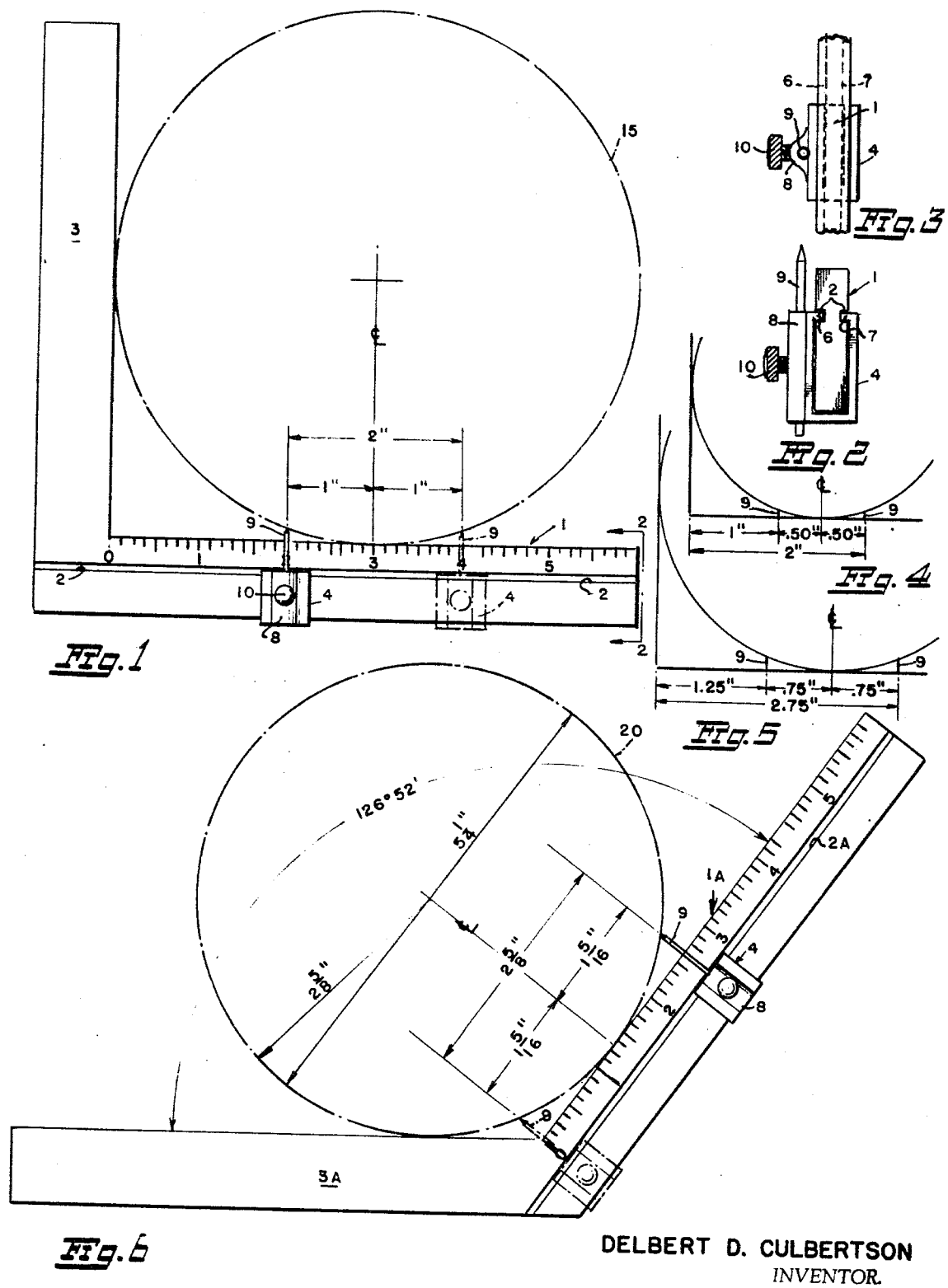
DELBERT D. CULBERTSON
INVENTOR.
BY James D. Girman
ATT'Y

3,754,335

INSTRUMENT FOR DETERMINING THE DIAMETER OR RADIUS OF AN OBJECT OF CIRCULAR CROSS SECTION

CROSS-REFERENCE TO RELATED APPLICATION

This application is a continuation-in-part of my earlier filed application Ser. No. 862,835 filed Oct. 1, 1969 now abandoned and entitled Instrument For Determining The Radii And Diameter Of Circular Or Cylindrical Objects.

BACKGROUND OF THE INVENTION

This invention relates to measuring instruments, and more particularly to a simplified instrument for the accurate measurement of diameter or radius of an object having a circular cross section.

The approximate diameter of an object of circular cross section may be measured by means of a carpenter's square, by abutting the right angular scale edges thereof against the object and reading the scale at the point of contact of the object with either scale edge. It will be apparent that this reading is the radius of the object and that the diameter is twice the magnitude of the reading. Because of the difficulty of identifying the point of contact of the object with the scale, the error of measurement is quite large.

Accurate measurement of the diameter of relatively small objects is accomplished by means of conventional calipers and other similar venier scales. However, accurate measurement of the diameter or radius of relatively large objects heretofore has requried instruments which are of complex and therefore costly construction and which are of such excessive bulk as to be inconvenient to transport and use.

SUMMARY OF THE INVENTION

In its basic concept the instrument of this invention utilizes a pair of angularly arranged straight edges, providing an included angle of less than 180°, for engagement of said edges with circumferentially spaced points on an object of circular cross section. A scale of linear measurement is associated with one of the straight edges, and the angle between the edges is selected so that when an index pin, movable relative to the scale, is brought into contact with the object at opposite sides of the contact point of the object with the scale straight edge, the sum of the two scale readings is related to the diameter of the object by some whole integer or fraction thereof.

It is by virtue of the foregoing basic concept that the principal objective of this invention is achieved; namely, to overcome the aforementioned disadvantages associated with prior instruments.

Another important object of this invention is the provision of an instrument of the class described in which the magnitude of the included angle may be selected to accommodate the measurement of objects of circular cross section having a wide range of diameters.

A further important object of this invention is the provision of an instrument of the class described which is of minimum length an therefore capable of use with speed and facility in confined quarters.

The foregoing and other objects and advantages of this invention will appear from the following detailed description, taken in connection with the accompanying drawing of preferred embodiments.

BRIEF DESCRIPTION OF THE DRAWING

FIG. 1 is an elevational view showing one embodiment of an instrument embodying the features of this invention, the index pin assembly being shown in one position of measurement in full lines and in the associated second position of measurement in broken lines.

FIG. 2 is an end elevation as viewed in the direction of the arrows 2—2 in FIG. 1.

FIG. 3 is a fragmentary plan view as viewed from the top in FIG. 2.

FIG. 4 is a diagrammatic view illustrating the use of the instrument in measuring a circular object of lesser diameter than that shown in FIG. 1.

FIG. 5 is a view similar to FIG. 4 showing the use of the instrument in measuring a circular object of slightly greater diameter than that shown in FIG. 4.

FIG. 6 is a view similar to FIG. 1 showing a second embodiment of the invention.

DESCRIPTION OF THE PREFERRED EMBODIMENTS

With reference to the drawing, wherein like reference numerals designate like parts, and particularly FIGS. 1–3 thereof, numeral 1 indicates a horizontal arm grooved as at 2 along both of its sides and graduated along its top straight edge in inches and fractions thereof from 0 to 6, as shown. It will be readily understood that the scale graduations along the arm may be in decimal equivalents, in units of the metric system, or in any of the well known graduations of linear measurement.

The arm 1 is integral with a second angular arm 3 which provides a second straight edge forming with the straight edge of arm 1 an included angle of less than 180°. In the embodiment of FIG. 1, this angle is 90°. The arm 3 may or may not be graduated in various units of measurement, as desired.

Slidable along the arm 1 is an index comprising a carrier 4 of box-like formation with opposing horizontal top flanges 6 and 7 for slidable engagement with the grooves 2 along the sides of the arm. A vertical slide bearing 8 is formed on the front wall of the carrier 4 for an index pin 9 lockable in vertically adjusted positions relative to the carrier by a set screw 10. This vertical adjustment facilitates the measurement of objects of various diameters, as explained hereinafter.

The illustration in FIG. 1 is drawn to a reduced scale, as is apparent. In using the instrument to determine the radius or diameter of a circle, cylinder, sphere, or other object 15 of circular cross section, the inside straight edges of both arms 1 and 3 are placed in contact with the peripheral surface of the object, at circumferentially spaced points. The index pin carrier 4 then is slid along the arm until the inwardly projecting pin 9 engages the surface of the object, first to one side of the point of contact of the object with the straight edge of the scale arm 1, as illustrated by the left hand, full line position, and then to the opposite side of said contact point, as illustrated by the right hand, broken line position.

In the illustration of FIG. 1 it is to be noted that the index pin contacts the object at the scale positions of 2 inches and 4 inches, respectively. The sum of these two scale readings is 6 inches, which is the diameter of the object 15.

If desired, for example, the index pin 9 may be extended vertically so that it engages the object 15 at the scale markings of 1 ½ inch and 4 ½ inches, respectively. The sum of these two readings also gives a direct reading of 6 inches diameter for the object. Thus, it will be understood that regardless of the extent of projection of the index pin 9 from the scale straight edge, the sum of the two scale readings always will give a direct reading of the diameter of the object. Thus, the index pin may be extended or retracted, as desired for optimum accuracy of measurement of objects of varying diameters.

In using the instrument to measure objects of lesser diameter, as shown in FIGS. 4 and 5, the same manipulations are repeated. With particular reference to FIG. 4, it will be seen that with the pin 9 engaging the object at the 1 inch and the 2 inches markings on the scale, the sum of these two readings is 3 inches which is the diameter of the object.

In FIG. 5, the pin 9 engages the circular object at the scale markings of 1.25 inches and 2.75 inches, respectively. The sum of these two readings is 4 inches, which is the diameter of the object.

In the foregoing illustrations, the scales are marked in inches to give a direct reading of diameter. If it is desired that the scale give a direct reading of radius, a double scale marking is employed, i.e. the scale would be marked to indicate a total length of 3 inches, instead of 6 inches, as illustrated. Other whole number multiples or fractions of the diameter may be accommodated by appropriate variations of scale markings, as will be apparent.

In the embodiment of FIG. 1, the straight edges of the arms 1 and 3 are arranged to provide an included angle of 90°, as previously explained. This limits the utility of the instrument to the measurement of diameters somewhat less than 12 inches, unless the arms 1 and 3 are extended in length from the 6 inches length illustrated. For some purposes, such extension of length may render the tool cumbersome to use and inconvenient to transport and store, for example in a utility box. Accordingly, for the measurement of objects of larger diameter, the embodiment illustrated in FIG. 6 is preferred.

In the embodiment of FIG. 6, the arm 1A, the grooves 2A on both sides of the arm and the graduated scale from 0-6 inches are the same as on the arm 1 in the embodiment of FIG. 1. The included angle between the inner straight edges of the arms 1A and 3A is chosen to be 126° 52'. By virtue of this selected included angle, an object 20 of circular cross section placed in contact with both straight edges engages the scale straight edge at a point on a line extending from the center of the object and perpendicular to the scale straight edge, which point represents one-half of the radius of the object, or one-fourth the diameter. In the illustration of FIG. 6, the scale reading at that point is 1 5/16 inch. This distinguishes from the FIG. 1 embodiment wherein, by virtue of the 90° included angle formed by the straight edges of the arms 1 and 3, the point of contact of the circular object 15 with the scale straight edge is on a line extending from the center of the object and perpendicular to the scale straight edge, which indicates the radius of the object (3 inches in the illustration).

To determine the radius of the circular object 20 in FIG. 6, the index pin 9 is moved along the arm 1A until it engages the object first at one side and then at the other of the point of contact of the object with the scale straight edge. As illustrated in FIG. 6, the index pin engages the object 20 at the scale readings of zero and 2 ⅝ inches, respectively. The sum of these readings, 2 ⅝ inches, is the radius of the object 20. The diameter of the object 20 obviously is twice the radius, or 5 ¼ inches.

As in the manner previously explained, the index pin 9 may be retracted from the position of extension illustrated in FIG. 6, so that it engages the object 20, for example, at the scale readings of one-half inch and 2 ⅛ inch, respectively. The sum of these two readings still is 2 ⅝ inches, the radius of the object 20.

From a comparison of FIGS. 1 and 6, it is apparent that the angular arrangement of FIG. 6 provides for the measurement of much larger diameters than is capable with the arrangement of FIG. 1, even though the lengths of the arms are the same.

In the event it is desired that the scale on arm 1A give a direct reading of diameter of an object 20, a half scale type marking will be employed, i.e. the scale will be marked to indicate a total of 12 inches instead of the 6 inches indicated.

As a further illustration of modification of the invention, the included angle between the straight edges of arms 1A and may be selected to be 168° 34', to provide direct scale reading of one-tenth the diameter. However, it will be apparent that an instrument having such a large included angle is usable only in the measurement of very large diameter objects, for example objects having a diameter of at least about 4 feet. As still another example, an included angle of 53° 8' will provide direct reading of twice the diameter of an object.

From the foregoing illustrations, it will be apparent that a direct reading of any whole integer or fraction of a diameter may be achieved by selecting the included angle such that the tangent of one-half said angle is the reciprocal of said whole integer or fraction, i.e. tan $L/2$ = $1/N$ wherein $N$ is said whole integer or fraction. For example, if it is desired to read the diameter directly, as the sum of the two scale readings as previously explained, the included angle is selected to be the angle the tangent of one-half of which is 1,000. If it is desired to read the radius, or one-half the diameter, the included angle is selected to be that angle the tangent of one-half of which is 2,000. If it is desired to read one-tenth the diameter, the included angle is selected to be that angle the tangent of one-half of which is 10,000.

From the foregoing it will be appreciated that the present invention provides an instrument of simplified and therefore economical construction which functions effectively to provide for the accurate measurement of diameters of objects of circular cross section with speed and facility, by summing the scale readings corresponding to the points of contact of an index pin with the surface of an object at points disposed to opposite sides of the point of contact of the object with the scale straight edge. The instrument is of minimum length and bulk, whereby to render it usable conveniently in confined quarters and to facilitate its transport and storage.

Although the instrument is used primarily for direct determination of diameter or radius of objects of circular cross section, it will be apparent that either of these parameters may be employed in the determination of other corresponding parameters, such as the area of a circle, the circumference, surface area and volume of a cylinder or sphere, and others.

It will be apparent to those skilled in the art that various changes may be made in the size, shape, number, type and arrangement of parts described hereinbefore. For example, a pair of indexes, each including the components 4–10, may be mounted for independent movement on the arm 1 or 1A into engagement with the object 15 or 20 each at opposite sides of the point of contact of the object with the straight edge of the arm 1 or 1A, as illustrated by the full and broken line positions in FIGS. 1 and 6. It will be understood, of course, that both index pins 9 must project to equal lengths inwardly of the straight edge. These and other changes may be made without departing from the spirit of this invention.

Having now described my invention and the manner in which it may be used, I claim:

1. An instrument for determining the diameter and corresponding parameters of an object of circular cross section, comprising:
   a. a pair of interconnected elongated arms providing straight edges arranged angularly to form a fixed included angle of less than 180°, said straight edges being adapted to engage an object of circular cross section at circumferentially spaced points,
   b. a scale of linear measurements on one of the arms associated with the corresponding straight edge and originating at the apex of the included angle, and
   c. index means registering with the scale and movable longitudinally on the scale arm and extending inwardly of and perpendicular to the associated straight edge for engagement with the periphery of an object of circular cross section to be measured, at points spaced to opposite sides of the point of contact of the object with the scale arm straight edge, and inwardly of the point of contact of the object with the straight edge of said other arm.
   d. whereby the sum of the scale readins at said spaced points of engagement of the index means with the object is proportional to the diameter and corresponding parameters of the object.

2. The method of determining the diameter and corresponding parameters of an object of circular cross section, comprising:
   a. providing a pair of interconnected elongated arms providing straight edges arranged angularly to form a fixed included angle of less than 180°, one of the arms having thereon a scale of linear measurement associated with the corresponding straight edge and originating at the apex of the included angle, and index means registering with the scale and movable longitudinally on the scale arm and extending inwardly of the associated straight edge for engagement with the periphery of an object of circular cross section to be measured,
   b. placing the pair of straight edges in contact with circumferentially spaced points on an object of circular cross section to be measured,
   c. moving the index means into engagement with the object at the opposite sides of its point of contact with the scale straight edge and inwardly of the point of contact of the object with the straight edge of said other arm and noting the scale readings at said points of contact, and
   d. summing the pair of scale readings to obtain a measurement proportional to the diameter and corresponding parameters of the object.

3. The instrument of claim 1 wherein the index means includes:
   a. a carrier mounted on the scale arm for longitudinal movement, and
   b. an index pin mounted on the carrier and extending inwardly of the associated straight edge for said engagement with an object.

4. The instrument of claim 3 wherein the index pin is mounted on the carrier for adjustable extension relative to said straight edge.

* * * * *